US010317006B2

(12) United States Patent
Kozlowski, Jr. et al.

(10) Patent No.: US 10,317,006 B2
(45) Date of Patent: Jun. 11, 2019

(54) DISPLAY MOUNTS AND RELATED ASSEMBLIES AND METHODS

(71) Applicant: WirePath Home Systems, Charlotte, NC (US)

(72) Inventors: William Jacob Kozlowski, Jr., Waxhaw, NC (US); Christopher Glenn Franck, Fort Mill, SC (US); Matthew R. Shute, Huntersville, NC (US); Jamie Lee Quinlan, Charlotte, NC (US)

(73) Assignee: Wirepath Home Systems, LLC, Charlotte, NC (US)

( * ) Notice: Subject to any disclaimer, the term of this patent is extended or adjusted under 35 U.S.C. 154(b) by 188 days.

(21) Appl. No.: 15/294,012

(22) Filed: Oct. 14, 2016

(65) Prior Publication Data
US 2017/0105529 A1    Apr. 20, 2017

Related U.S. Application Data

(60) Provisional application No. 62/241,606, filed on Oct. 14, 2015.

(51) Int. Cl.
*F16M 11/04*    (2006.01)
*F16M 11/20*    (2006.01)

(52) U.S. Cl.
CPC ....... *F16M 11/2092* (2013.01); *F16M 11/046* (2013.01); *F16M 11/048* (2013.01);
(Continued)

(58) Field of Classification Search
CPC .. F16M 11/043; F16M 11/046; F16M 11/048; F16M 11/2092; F16M 2200/047;
(Continued)

(56) References Cited

U.S. PATENT DOCUMENTS 1,239,666 A * 9/1917 Bladholm et al. ..... A47G 25/10
                                                    248/579
1,611,903 A * 12/1926 Gelb ..................... F16M 11/10
                                                    248/125.3

(Continued)

FOREIGN PATENT DOCUMENTS

WO    2014055128    4/2014

OTHER PUBLICATIONS

Smooth Motion Adjustable Tilting/Swiveling TV Wall Mount Bracket for LCD LED (5.5—44LBS, 17-37 Inch), http://mounts4less.com/store/index.php?route=product/product&product_id=322; Jul. 8, 2014, 2 pages.

*Primary Examiner* — Muhammad Ijaz
*Assistant Examiner* — Guang H Guan
(74) *Attorney, Agent, or Firm* — Myers Bigel, P.A.

(57)    ABSTRACT

A display mount includes a vertical adjustment mechanism configured to be operatively coupled to a wall and a horizontal adjustment mechanism having a first end portion operatively coupled to the vertical adjustment mechanism and a second end portion that is configured to be operatively coupled to a display. With the vertical adjustment mechanism operatively coupled to the wall and with the display operatively coupled to the horizontal adjustment mechanism: the vertical adjustment mechanism is configured to lower and raise the display vertically parallel to the wall without the display moving substantially horizontally away from and toward the wall; and the horizontal adjustment mechanism is configured to extend and retract the display horizontally away from and toward the wall without the display moving substantially vertically parallel to the wall.

11 Claims, 11 Drawing Sheets

(52) U.S. Cl.
CPC . *F16M 2200/047* (2013.01); *F16M 2200/048* (2013.01); *F16M 2200/061* (2013.01)

(58) Field of Classification Search
CPC ........ F16M 2200/048; F16M 2200/061; Y10S 248/917; Y10S 248/919; Y10S 248/92
USPC ....... 248/279.1, 285.1, 286.1, 287.1, 295.11, 248/298.1, 917, 919, 920, 277.1
See application file for complete search history.

(56) References Cited

U.S. PATENT DOCUMENTS

| | | | | |
|---|---|---|---|---|
| 2,471,998 | A * | 5/1949 | Berggren | A61B 6/447 192/17 R |
| 3,575,368 | A * | 4/1971 | Thomas | A61B 6/447 248/572 |
| 3,862,734 | A * | 1/1975 | Buchin | G03B 27/56 248/125.2 |
| 4,234,155 | A * | 11/1980 | Destree | B25D 17/28 173/190 |
| 5,007,608 | A | 4/1991 | Carroll, Jr. | |
| 5,316,260 | A * | 5/1994 | Johnston | A61B 3/18 248/123.2 |
| 5,876,008 | A | 3/1999 | Sweere et al. | |
| 5,971,348 | A * | 10/1999 | Thomas | F16M 11/18 248/124.1 |
| 6,189,849 | B1 * | 2/2001 | Sweere | A47B 21/0314 248/286.1 |
| 6,286,794 | B1 * | 9/2001 | Harbin | A47B 21/02 248/123.2 |
| 6,402,109 | B1 | 6/2002 | Dittmer | |
| 6,419,196 | B1 | 7/2002 | Sweere et al. | |
| 7,063,296 | B2 * | 6/2006 | Williams | F16M 11/10 248/244 |
| 7,317,611 | B2 | 1/2008 | Dittmer | |
| 7,487,943 | B1 | 2/2009 | Gillespie | |
| 7,690,611 | B2 | 4/2010 | Asamarai et al. | |
| 7,823,849 | B2 | 11/2010 | Dittmer et al. | |
| 7,866,621 | B1 | 1/2011 | Walters | |
| 7,918,428 | B2 * | 4/2011 | Kim | F16M 11/048 248/295.11 |
| 7,952,863 | B1 | 5/2011 | Stifal | |
| 8,074,950 | B2 | 12/2011 | Clary | |
| 8,083,458 | B2 | 12/2011 | Wilkie | |
| 8,154,885 | B2 | 4/2012 | Anderson | |
| 8,235,342 | B2 | 8/2012 | Pfister et al. | |
| 8,456,808 | B2 | 6/2013 | Grey et al. | |
| 8,464,586 | B2 * | 6/2013 | Wu | A61B 5/0051 73/584 |
| 8,474,835 | B1 * | 7/2013 | Rossi | B62B 3/02 280/47.35 |
| 8,490,934 | B2 | 7/2013 | Dittmer | |
| 8,508,918 | B2 | 8/2013 | Dittmer et al. | |
| 8,523,129 | B2 | 9/2013 | Stifal et al. | |
| 8,542,499 | B2 | 9/2013 | Skull | |
| 8,561,955 | B2 | 10/2013 | Stemple | |
| 8,596,591 | B2 | 12/2013 | Theis et al. | |
| 8,693,172 | B2 | 4/2014 | Russell et al. | |
| 8,746,642 | B2 | 6/2014 | Molter | |
| 9,091,393 | B2 * | 7/2015 | Huang | F16M 11/046 |
| 9,546,756 | B1 * | 1/2017 | Hung | F16M 11/041 |
| 9,791,093 | B2 * | 10/2017 | Aoyagi | F16M 11/046 |
| 9,919,333 | B2 * | 3/2018 | Wright | B05B 15/68 |
| 2007/0001076 | A1 | 1/2007 | Asamarai et al. | |
| 2007/0153459 | A1 | 7/2007 | Wohlford et al. | |
| 2007/0252056 | A1 | 11/2007 | Novin | |
| 2010/0001153 | A1 | 1/2010 | Stenhouse et al. | |
| 2010/0172072 | A1 | 7/2010 | Monaco | |
| 2011/0079685 | A1 | 4/2011 | Kwak | |
| 2012/0032062 | A1 | 2/2012 | Newville | |
| 2012/0033371 | A1 | 2/2012 | Pankros et al. | |
| 2012/0320506 | A1 | 12/2012 | Bentz et al. | |
| 2013/0056601 | A1 | 3/2013 | Stemple et al. | |
| 2013/0187019 | A1 | 7/2013 | Dittmer et al. | |
| 2013/0256489 | A1 | 10/2013 | Ergun et al. | |
| 2017/0105529 | A1 * | 4/2017 | Kozlowski, Jr. | F16M 13/02 |

* cited by examiner

DISPLAY MOUNTS AND RELATED ASSEMBLIES AND METHODS

RELATED APPLICATIONS

This application claims priority from U.S. Provisional Application No. 62/241,606, filed Oct. 14, 2015, the disclosure of which is hereby incorporated herein in its entirety.

BACKGROUND

Electronic displays are sometimes mounted in positions that provide for less than desirable viewing angles. For example, electronic displays are often mounted over fireplace mantels and/or in recessed niches for aesthetic and/or spatial reasons. However, many users find that a display mounted over a fireplace mantel and/or in a recessed niche is mounted too high for comfortable viewing.

SUMMARY

Some embodiments of the present invention are directed to a display mount. The display mount includes a vertical adjustment mechanism configured to be operatively coupled to a wall and a horizontal adjustment mechanism having a first end portion operatively coupled to the vertical adjustment mechanism and a second end portion that is configured to be operatively coupled to a display. With the vertical adjustment mechanism operatively coupled to the wall and with the display operatively coupled to the horizontal adjustment mechanism: the vertical adjustment mechanism is configured to lower and raise the display vertically parallel to the wall without the display moving substantially horizontally away from and toward the wall; and the horizontal adjustment mechanism is configured to extend and retract the display horizontally away from and toward the wall without the display moving substantially vertically parallel to the wall.

Some other embodiments of the present invention are directed to a method including providing a display mount including: a vertical adjustment mechanism configured to be operatively coupled to a wall; and a horizontal adjustment mechanism having a first end portion operatively coupled to the vertical adjustment mechanism and a second end portion that is configured to be operatively coupled to a display. The method includes: operatively coupling the vertical adjustment member to a wall; operatively coupling a display to the horizontal adjustment mechanism; extending the display and/or the horizontal adjustment mechanism horizontally away from the wall without the display moving substantially vertically parallel to the wall; and then lowering the display and/or the vertical adjustment mechanism vertically parallel to the wall without the display moving substantially horizontally away from or toward the wall.

Further features, advantages and details of the present invention will be appreciated by those of ordinary skill in the art from a reading of the figures and the detailed description of the preferred embodiments that follow, such description being merely illustrative of the present invention.

DETAILED DESCRIPTION

Figure 1:
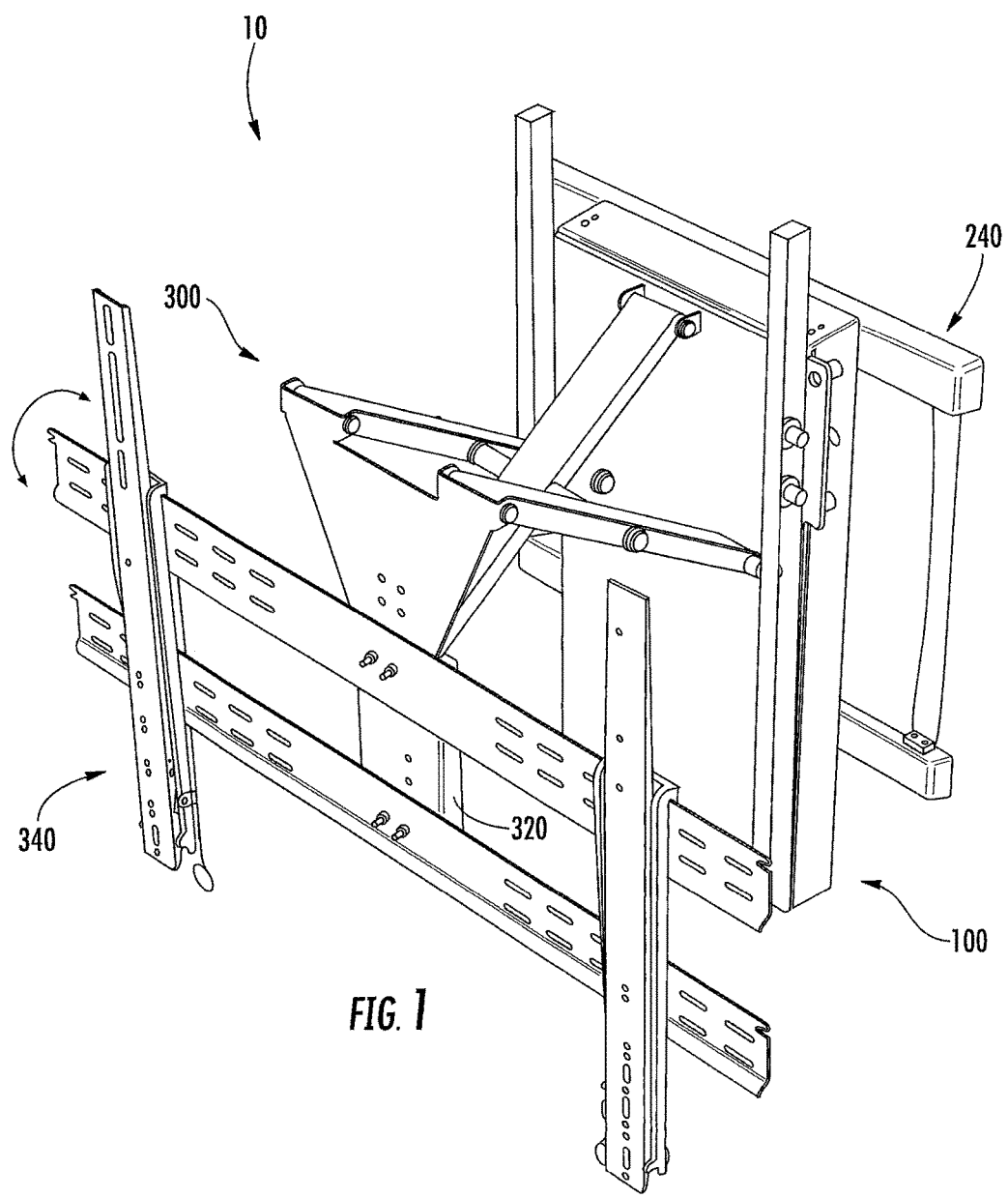
FIG. 1 is a perspective view of a display mount according to some embodiments.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout. As used herein the term "and/or" includes any and all combinations of one or more of the associated listed items.

In addition, spatially relative terms, such as "under," "below," "lower," "over," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

It is noted that any one or more aspects or features described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A display mount 10 according to some embodiments is illustrated in FIG. 1. The display mount 10 includes a lift mechanism assembly or vertical adjustment assembly 100 and an articulating arm assembly or horizontal adjustment assembly 300. As will be described in more detail below, when the mount 10 is coupled to a vertical mounting structure or surface such as a wall, the vertical adjustment assembly 100 is configured to translate a display coupled to the mount 10 vertically parallel to the wall and the horizontal adjustment assembly 300 is configured to translate the display coupled to the mount 10 horizontally away from and toward the wall.

The vertical adjustment assembly 100 according to some embodiments is illustrated in FIGS. 2-5. The assembly 100 includes a chassis or inner housing 102. Left and right outer housings 104, 106 may be coupled to the inner housing 102 (e.g., when the mount is in use). The left and right outer housings 104, 106 may be removed from the inner housing 102 (e.g., when the mount is being installed and/or serviced).

The inner housing 102 includes a back wall 108, a bottom wall 110, a top wall 112, a left sidewall 114 and an opposite right sidewall 116. A left vertical flange 115 extends inwardly from the left sidewall 114 and a right vertical flange 117 extends inwardly from the right sidewall 116.

The left outer housing 104 includes a front wall 118, a bottom wall 120, a top wall 122 and a left sidewall 124. Similarly, the right outer housing 106 includes a front wall 128, a bottom wall 130, a top wall 132 and a right sidewall 134.

The inner housing 102, the left outer housing 104, and the right outer housing 106 may collectively be referred to as the "housing" of the vertical adjustment assembly 100.

A left movable bracket 140 is mounted at the inner housing left sidewall 114 and is configured to translate up and down the inner housing left sidewall 114, as will be described in more detail below. A right movable bracket 142 is mounted at the inner housing right sidewall 116 and is configured to translate up and down the inner housing right sidewall 116, as will also be described in more detail below.

A spring assembly 144 includes one or more springs 146 that extend between lower and upper spring brackets 148, 150. The lower bracket 148 is coupled to the inner housing bottom wall 110 by a fastener 152 such as a bolt.

A wheel assembly 154 is coupled to the inner housing back wall 108. The wheel assembly 154 includes a first or main pulley 156 and a cam 158. The cam 158 includes an attachment point 160 and a cam profile surface 162. The attachment point 160 may alternatively be on the pulley 156 adjacent the cam 158. The first pulley 156 and the cam 158 are coupled such that they rotate together. According to some embodiments, the pulley 156 and the cam 158 are integrally formed.

A first or lower cable 164 extends between the spring assembly 144 and the wheel assembly 154. Specifically, a first end of the cable 164 is coupled to the spring assembly upper bracket 150. A second, opposite end of the cable 164 is coupled to the attachment point 160 at or near a tip of the cam. In this regard, as the first pulley 156 and the cam 158 rotate counterclockwise, the cable 164 winds or wraps along the cam profile surface 162. The cable 164 may extend over a second pulley 168 positioned between the spring assembly 144 and the wheel assembly 154.

A second or upper cable 170 extends between the first pulley 156 and the right movable bracket 142. A first end of the cable 170 is coupled to an attachment point 174 of the first pulley 156 and a second, opposite end of the cable 170 is coupled to a safety latch or lock mechanism 176 that in turn is coupled to the right movable bracket 142. The cable 170 may extend over a third pulley 178 positioned between the wheel assembly 154 and the right movable bracket 142.

The cables 164, 170 may be formed of any suitable material. For example, the cables 164, 170 may be or include steel.

Figure 2:
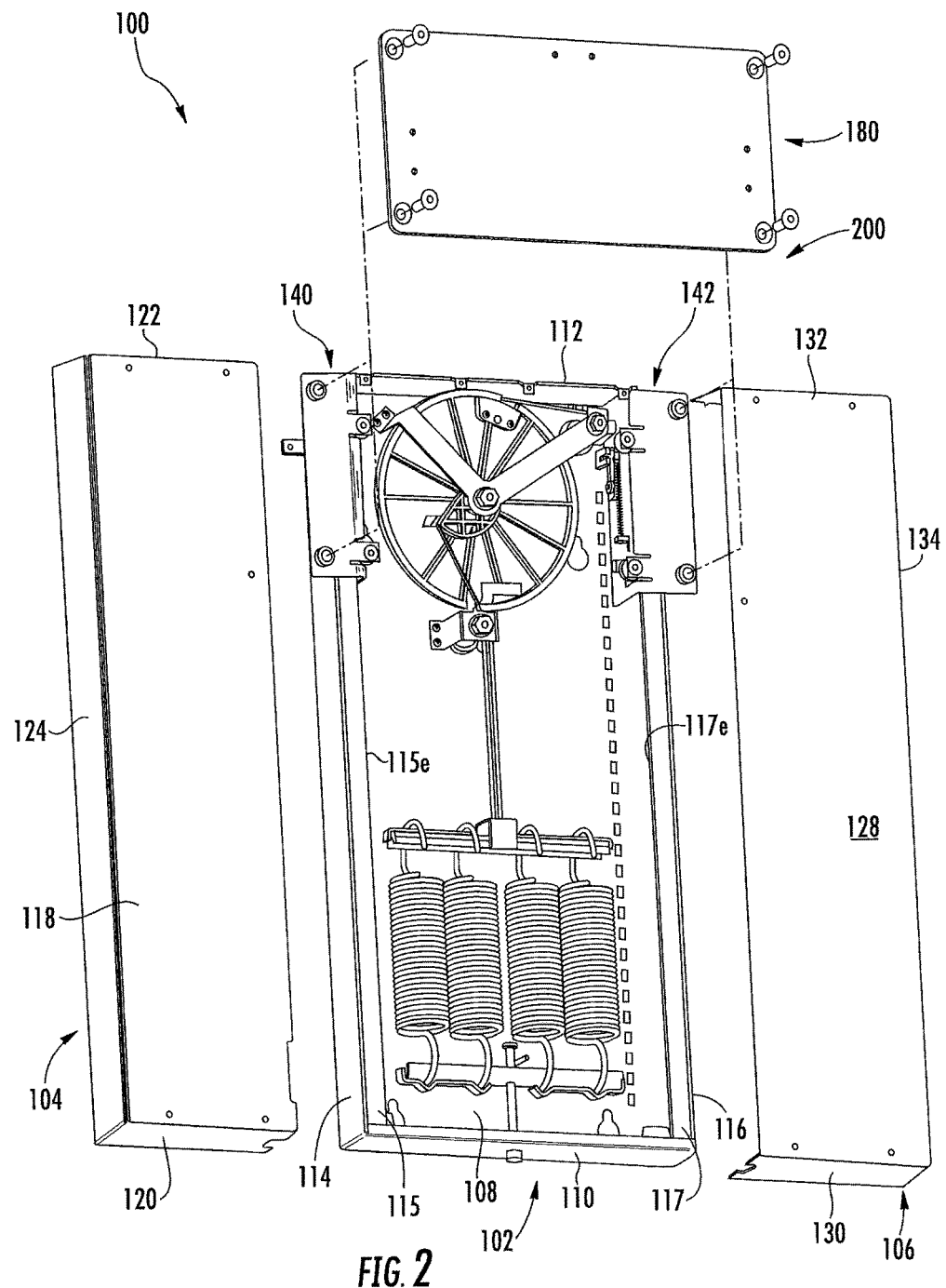
FIG. 2 is a partially exploded perspective view of a vertical adjustment assembly of the mount of FIG. 1 according to some embodiments.

Referring to FIG. 2, a super plate 180 is coupled to the left and right movable brackets 140, 142. As noted above, the left and right movable brackets 140, 142 are configured to translate up and down relative to the inner housing 102 and the outer housings 104, 106. The super plate 180 connects the left and right movable brackets 140, 142 such that they translate up and down together. The left and right movable brackets 140, 142 and the super plate 180 may collectively be referred to as a "lift" 200 that is configured to translate up and down.

The second cable 170 is wound around the first pulley 156 when the lift 200 is in an upper position as illustrated in FIGS. 1-5. As the lift 200 translates downward, the cable 170 unwinds from the first pulley 156. According to some embodiments, the lift 200 is translatable between the upper position and a lower position with the left and right movable brackets 140, 142 and the super plate 180 at or adjacent a bottom of the inner housing 102 and the outer housings 104, 106. According to some embodiments, the circumference of the main pulley 156 corresponds to the distance of vertical travel between the upper and lower positions.

The spring assembly 144 provides a counterbalance force (balancing force) to offset the weight of the movable brackets 140, 142 and the super plate 180 and any load coupled to the super plate 180 (e.g., the articulating assembly 300 shown in FIG. 1 and/or an electronic display coupled thereto). The cam 158 may be shaped and positioned to provide an approximate constant lifting (and lowering) force to assist in the translation of the movable brackets 140, 142 and the super plate 180 and any load coupled to the super plate 180. This allows for easier and user-friendly adjustment of the height of the movable brackets 140, 142 and the super plate 180.

The spring(s) 146 of the spring assembly 144 may not exert a constant linear force on the lower cable 164. Instead, the springs 146 may exert a linear force that varies with the amount of deflection (extension or contraction) of the springs 146. Accordingly, the cam 158 including the cam surface 162 may be shaped and positioned to convert the variable force of the springs 146 into a substantially constant torque force on the main pulley 156. The main pulley 156 then relays the constant torque to the upper cable 170

Figure 6:
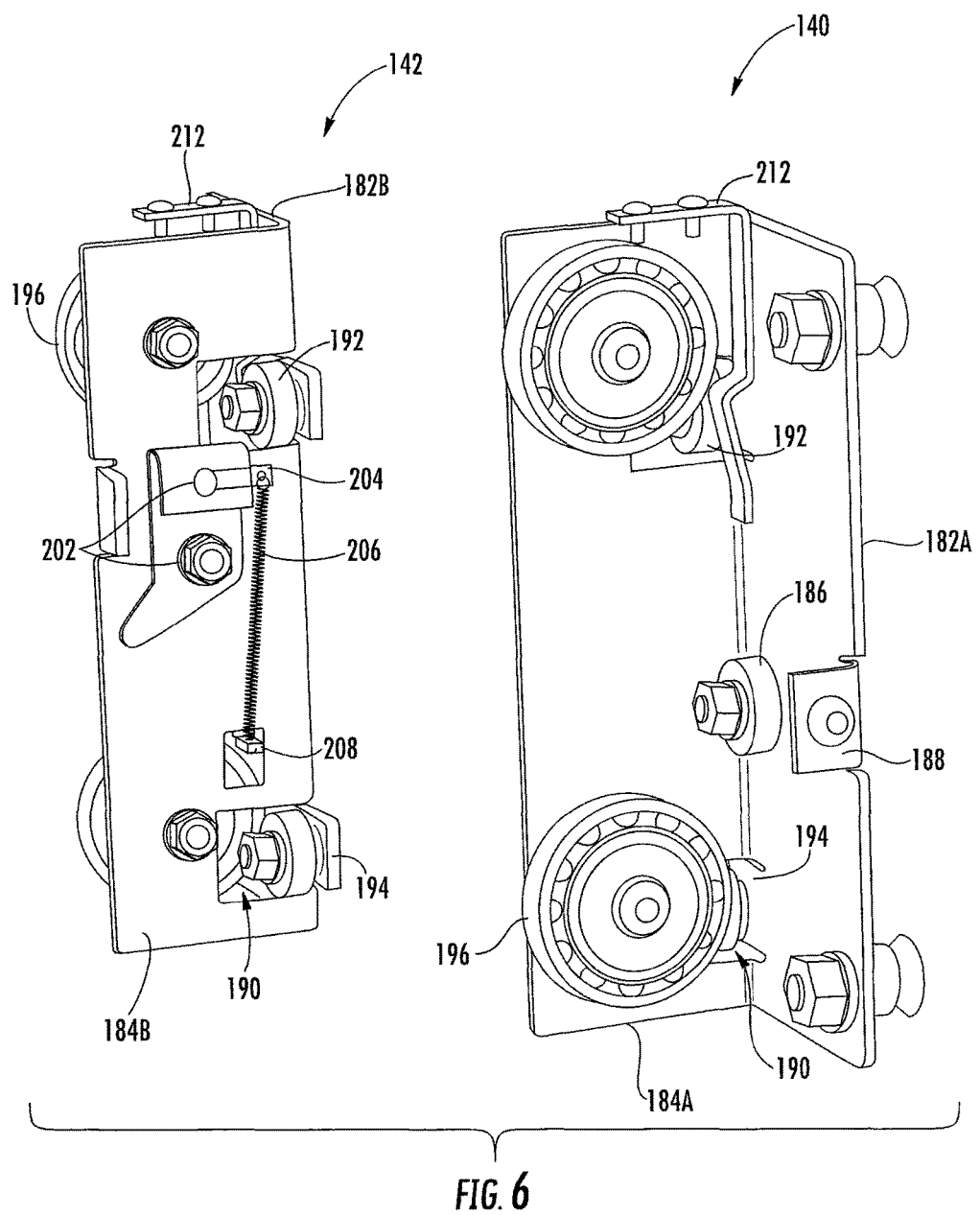
FIG. 6 is a perspective view of movable brackets that are used with the vertical adjustment assembly of FIG. 2 according to some embodiments.

The left and right movable brackets 140, 142 and associated components are illustrated in FIG. 6. The inner housing 102, the outer housings 104, 106 and other components are not shown in FIG. 6 to more clearly illustrate the left and right movable brackets 140, 142 and associated components.

Figure 3:
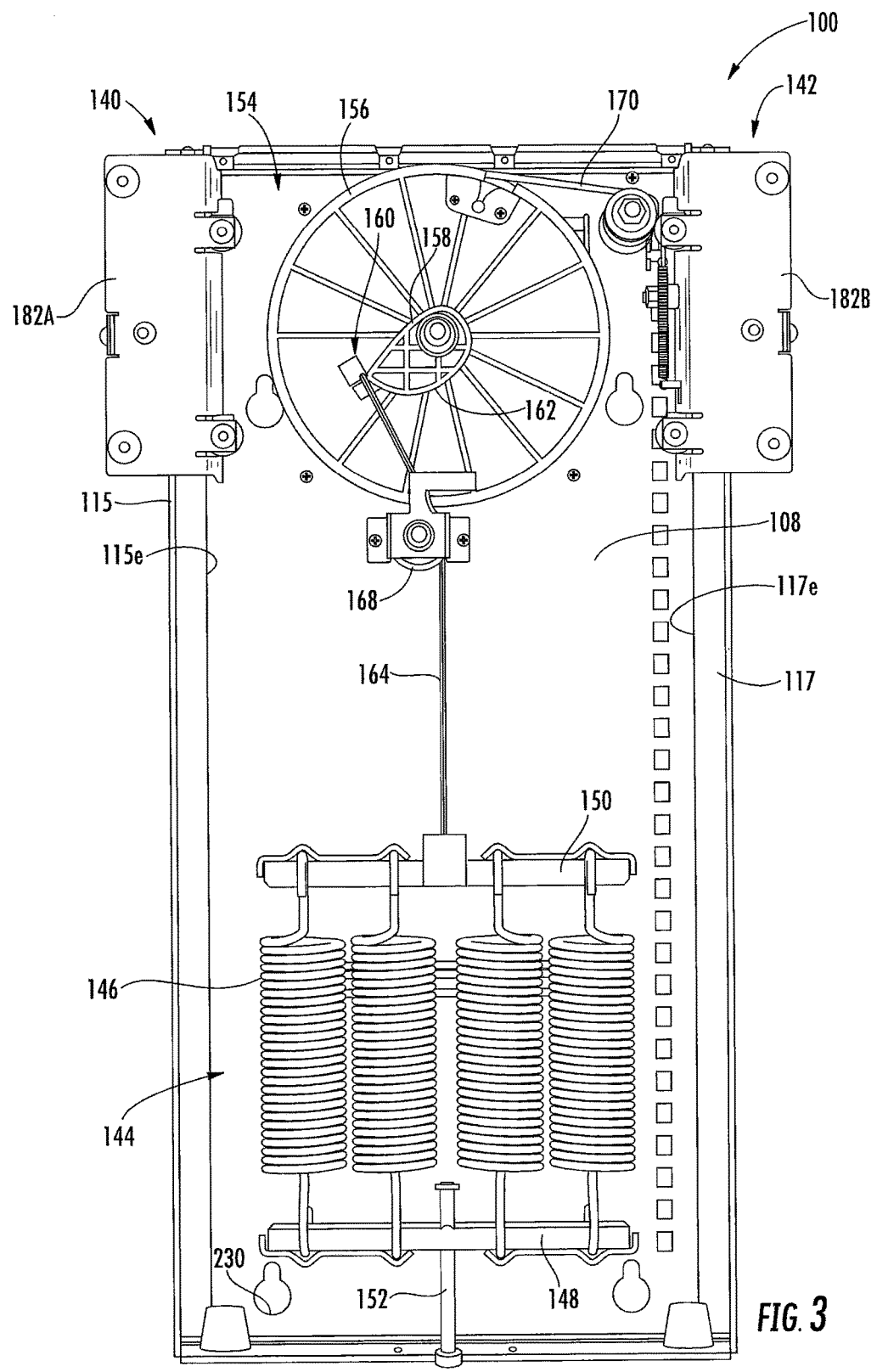
FIG. 3 is a front view of the vertical adjustment assembly of FIG. 2.

The left movable bracket 140 may be L-shaped or generally L-shaped with a front panel or portion 182A and a side panel or portion 184A. With reference to FIG. 3, the front panel 182A may be positioned adjacent or on the inner housing left vertical flange 115 (e.g., between the inner housing 102 and the left outer housing 104).

At least one first roller or rolling bearing 186 (also referred to herein as an idler bearing) is coupled to the front panel 182A or a tab 188 extending therefrom. The roller 186 may engage (e.g., roll on) the left outer housing sidewall 124 (FIG. 2) as the lift 200 translates up and down.

One or more apertures 190 may be defined in the side panel 184A of the left movable bracket 140. A second roller or rolling bearing 192 may extend at least partially through each aperture 190. Each roller 192 may be coupled to a tab 194 extending from the front panel 182A of the left movable bracket 140. The rollers 192 may engage (e.g., roll on) the left vertical flange 115 of the inner housing 102 or an edge 115e thereof (FIG. 3) as the lift 200 translates up and down.

One or more third rollers or rolling bearings 196 may be coupled to the side surface 184A of the left movable bracket 140. The rollers 196 may engage (e.g., roll on) the inner housing back wall 108 and/or the inner housing left vertical flange 115 (FIG. 3) as the lift 180 translates up and down.

Referring to FIGS. 2, 3 and 6, the right movable bracket 142 may be L-shaped or generally L-shaped with a front panel or portion 182B and a side panel or portion 184B. Similar to the left movable bracket 140, the right movable bracket may include the rollers 186, 192 and 196. The roller 186 may engage (e.g., roll on) the right outer housing sidewall 134 as the lift 200 translates up and down. The rollers 192 may engage (e.g., roll on) the right vertical flange 117 of the inner housing 102 or an edge 117e thereof as the lift 200 translates up and down. The rollers 196 may engage (e.g., roll on) the inner housing back wall 108 and/or the inner housing right vertical flange 117 as the lift 180 translates up and down.

The rollers 186, 192 and 196 provide stability for the lift 200 and help ensure that the lift 200 translates up and down smoothly and evenly on the left and right sides. The present inventors found that the upper cable 170 sometimes applied too much force on the right movable bracket 142 which introduced a torque to the lift 200 that tended to tilt the lift 200 when translated up and down. The present inventors also found that, particularly when the articulating arm assembly 300 and a display device coupled thereto was extended away from the lift 200, the lift experienced large torques that affected the movement and stability of the lift 200. The present inventors discovered that the roller configuration described above (including the idler bearings) substantially reduced the effect of these forces and torques and allowed for the lift 200 to translate up and down evenly and smoothly.

The front panel 182B of the right movable bracket 142 may be the same or substantially similar to the front panel 182A of the left movable bracket 140. With reference to FIG. 3, the front panel 182B may be positioned adjacent or on the inner housing right vertical flange 117 (e.g., between the inner housing 102 and the right outer housing 104).

The side panel 184B of the right movable bracket 142 may be similar to the side panel 184A of the left movable bracket 140 with the differences described below.

Figure 4:
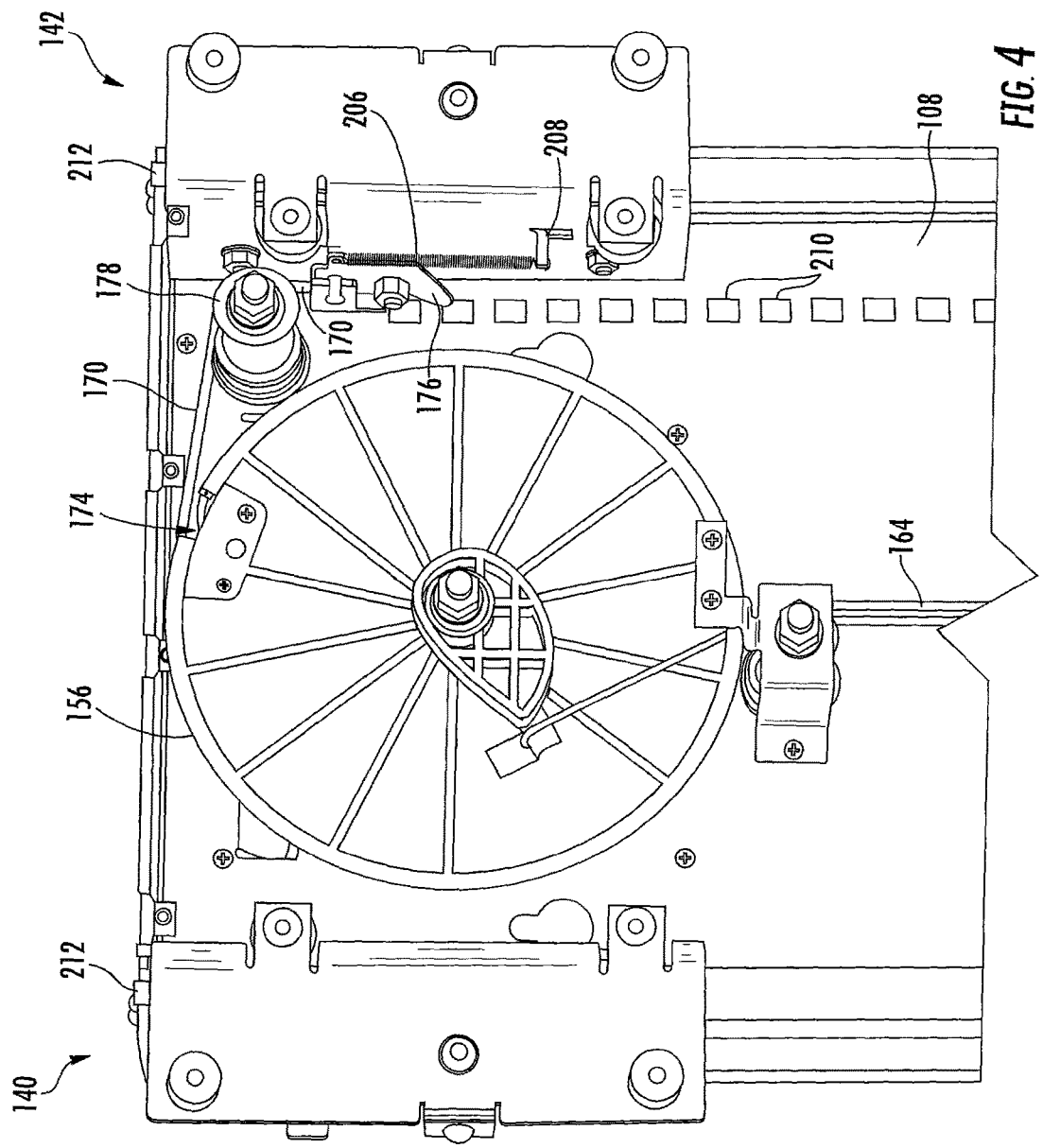
FIG. 4 is a fragmentary perspective view of the vertical adjustment assembly of FIG. 2.

With reference to FIGS. 4 and 6, one or more mounting features 202 are defined in or on the side panel 184B for mounting the safety latch 176. An eyelet or hook 204 is configured to hold one end of an extension spring 206. A tab 208 is configured to hold the opposite end of the spring 206. The safety latch 176 and the spring 206 are configured such that, if the lower cable 164 and/or the upper cable 170 were to break, the safety latch would be urged into one of a plurality of apertures 210 defined in the inner housing back wall 108. For example, the spring 206 may be positioned to bias the safety latch 176 toward the housing back wall 108 were the tension in the upper cable 170 reduced or eliminated. In this regard, the lift 200 would be held in position rather than falling downward due to the failure of the cable system.

According to some embodiments, the vertical adjustment assembly 100 includes a feature to retain the lift 200 in the upward position rather than allowing the lift 200 to potentially "sag" downward. Referring to FIGS. 4 and 6, a left detent 212 may be coupled to the inner housing upper wall 112 and/or the left outer housing upper wall 122 and a right detent 212 may be coupled to the inner housing upper wall 112 and/or the right outer housing upper wall 132 (FIG. 2). The detents 212 may extend downwardly along the front panels 182A, 182B of the left and right movable brackets 140, 142 when the lift 200 is at or near the upper position. The detents 212 are configured to receive and hold the rollers 196 when the lift 200 is in the upper position to help hold the lift 200 in that position.

Figure 7:
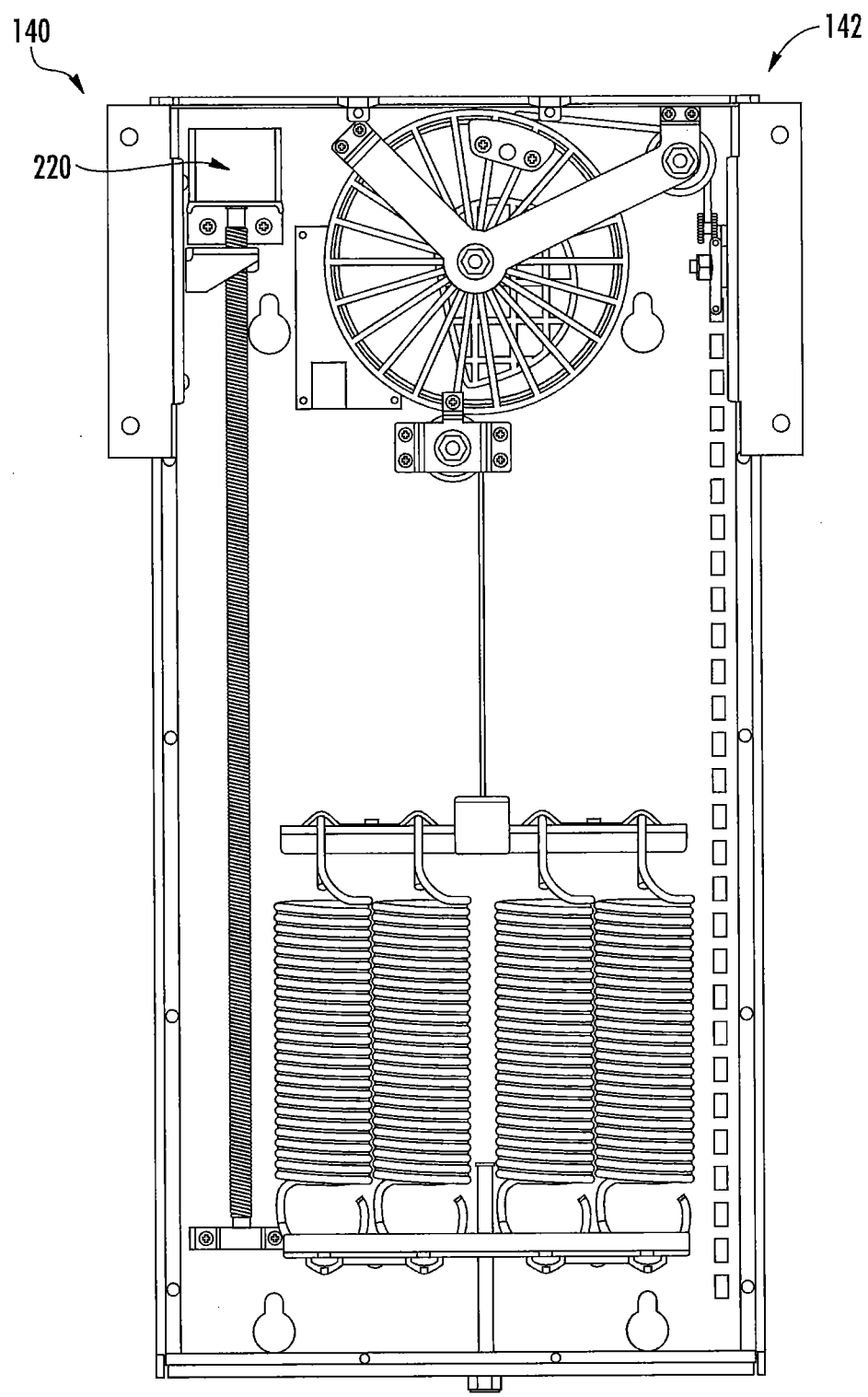
FIG. 7 is a front view of a vertical adjustment assembly according to some other embodiments.

The vertical adjustment assembly 100 as illustrated in FIGS. 1-6 is configured such that the lift 200 can be manually translated downwardly and upwardly. It is also contemplated that the lift 200 can be motorized as illustrated in the example embodiment of FIG. 7. The motor 220 is configured to translate the left and right movable brackets 140, 142 (and the super plate 180 connecting the movable brackets) upwardly and downwardly.

Figure 5:
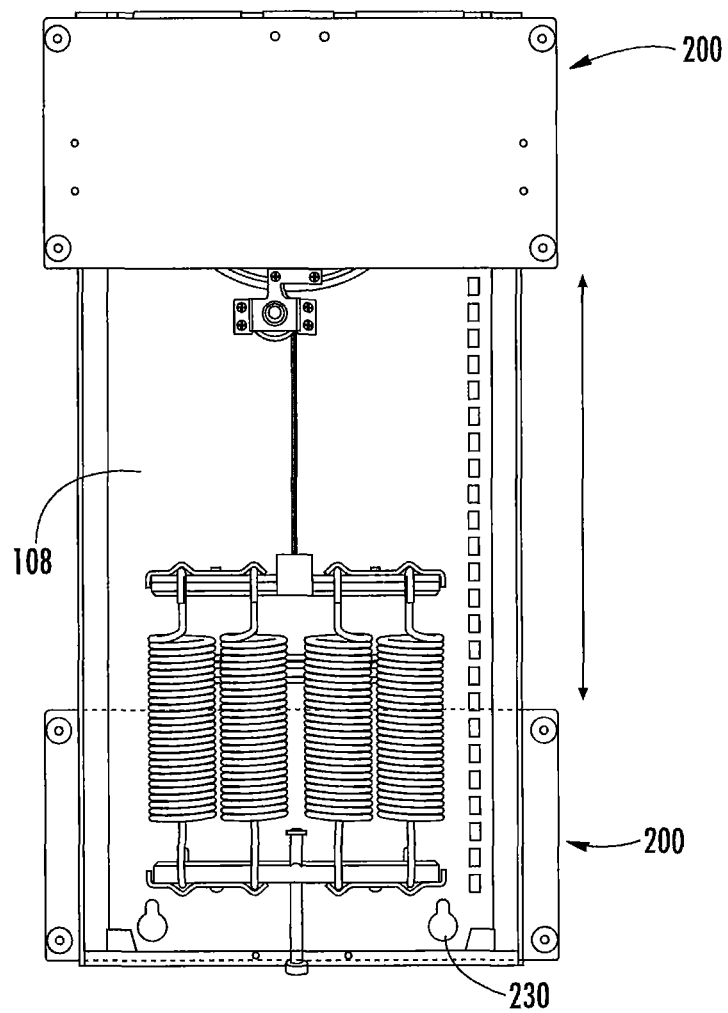
FIG. 5 is a front view of the vertical adjustment assembly of FIG. 2 illustrating a lift mechanism in an upper position and a lower position.

The vertical adjustment assembly 100 is configured to be mounted to a mounting structure or mounting surface such as a wall. The vertical adjustment assembly 100 may include a plurality of mounting apertures 230 defined in the inner housing back wall 108 (FIG. 5). The vertical adjustment assembly 100 may include alternative mounting features as will be understood by those skilled in the art. For example, referring to FIG. 1, the vertical adjustment assembly 100 may be coupled to a wall mount 240 which in turn may be coupled to a wall.

Figure 8:
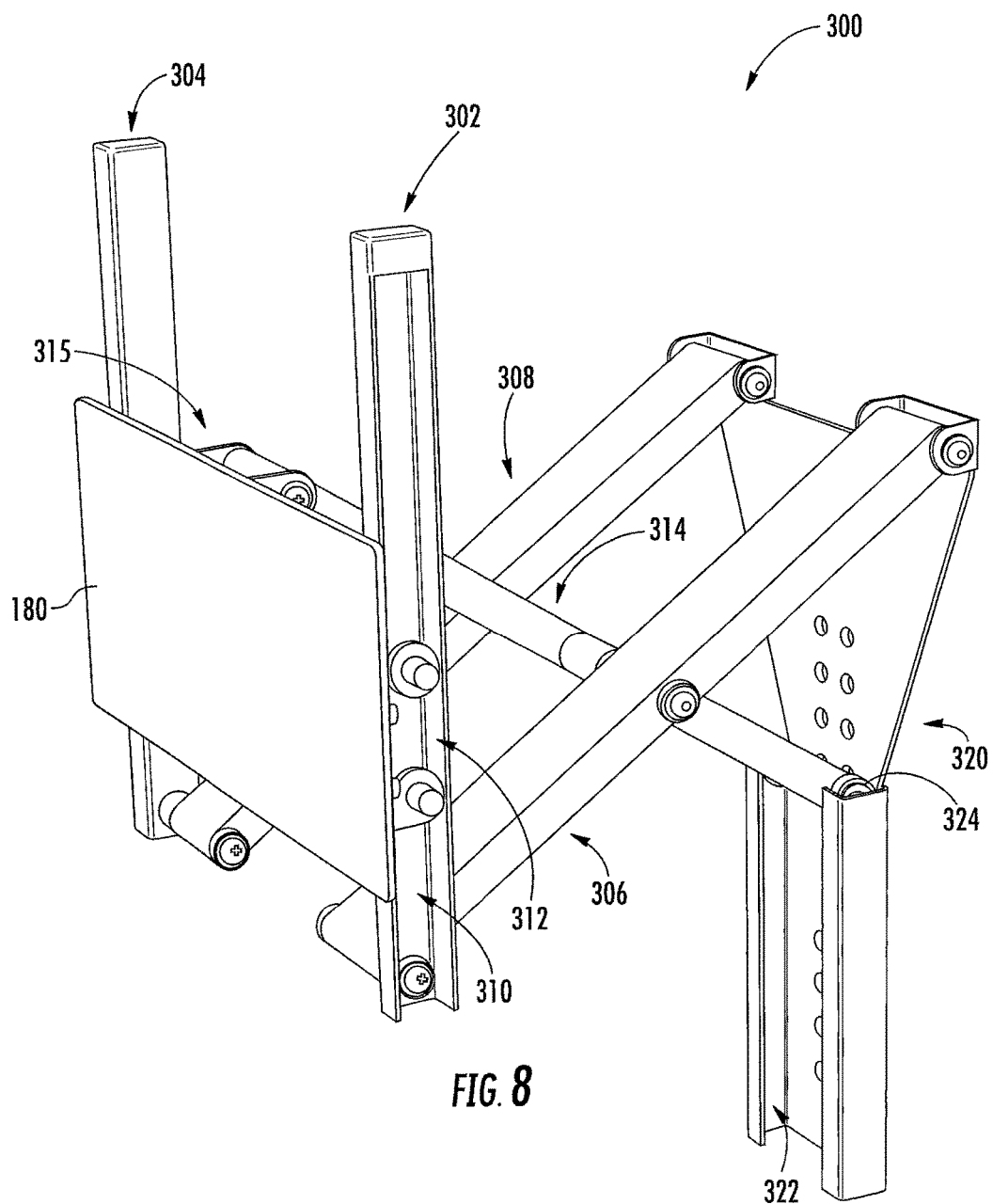
FIG. 8 is a perspective view of a horizontal adjustment assembly of the mount of FIG. 1 according to some embodiments.
Figure 9:
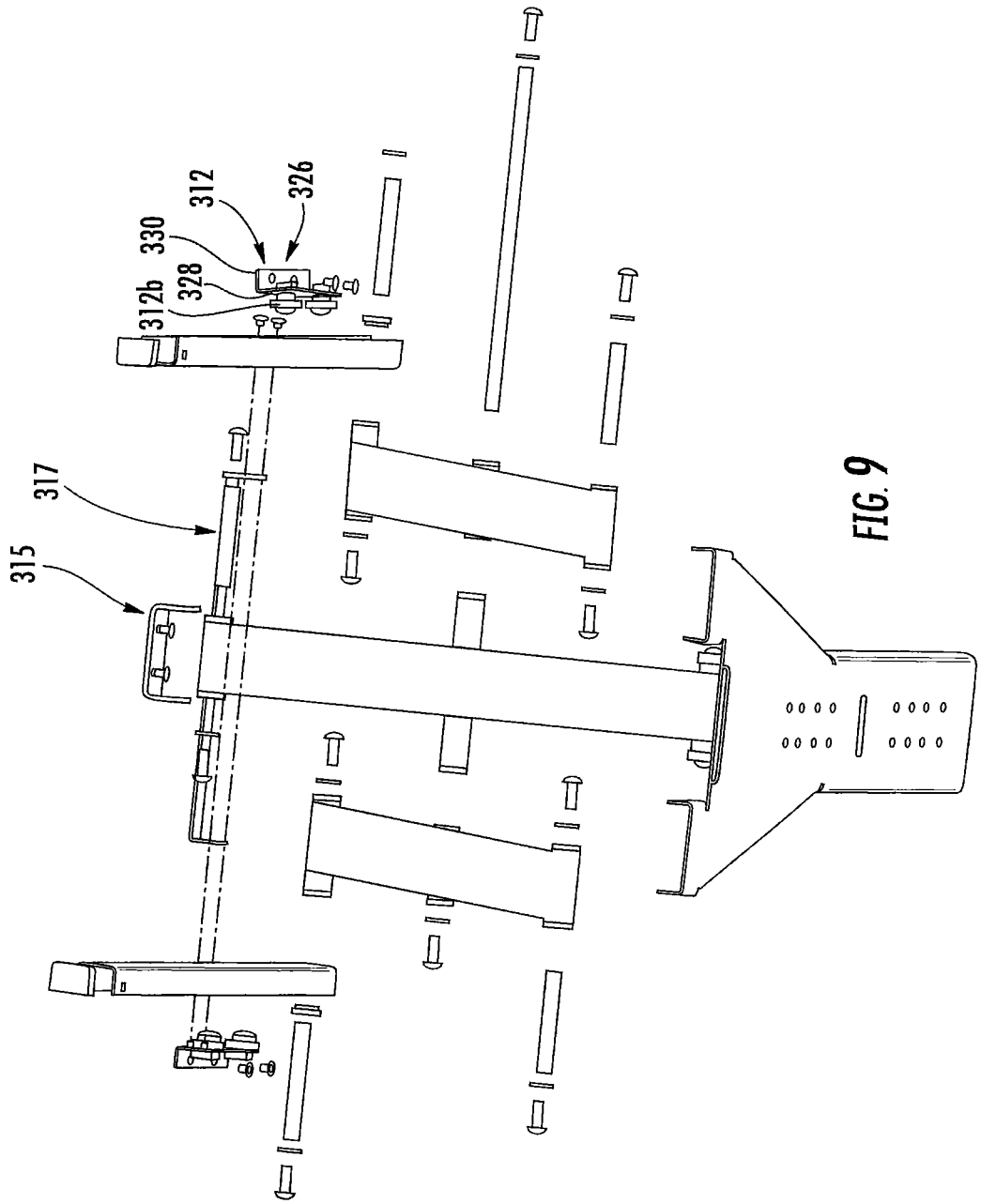
FIG. 9 is an exploded perspective view of the horizontal adjustment assembly of FIG. 8.

The articulating arm assembly 300 according to some embodiments is illustrated in FIGS. 8 and 9. The assembly 300 includes left and right vertical guide tracks 302, 304. The guide tracks 302, 304 are coupled to opposite sides of the super plate 180.

A first end of a left articulating arm 306 is pivotably coupled to the left guide track 302. A first end of a right articulating arm 308 is pivotably coupled to the right guide track 304. A channel 310 is defined by each of the guide tracks 302, 304. A bearing assembly 312 including one or more bearings is disposed in each channel 310.

A first end of a center articulating arm 314 may be pivotably coupled to a hub bracket 315. The hub bracket 315 may be at or adjacent the super plate 180. A shaft assembly 317 may include one or more shafts that may extend from the hub bracket 315 and may be coupled to each of the bearing assemblies 312. The center arm 314 is also pivotably coupled to each of the left and right arms 306, 308 at a center portion of the center arm 314.

A second, opposite end of each of the left and right arms 306, 308 is pivotably coupled to an upper portion of a bearing channel bracket 320 (also referred to herein as the display mount bracket). A pair of opposed channels 322 are formed on opposite sides of the bracket 320 extending upward from a bottom portion of the bracket 320.

A roller or rolling bearing 324 is on each opposite side of a second, opposite end of the center arm 314. The rollers 324 are received in the channels 322.

Figure 10:
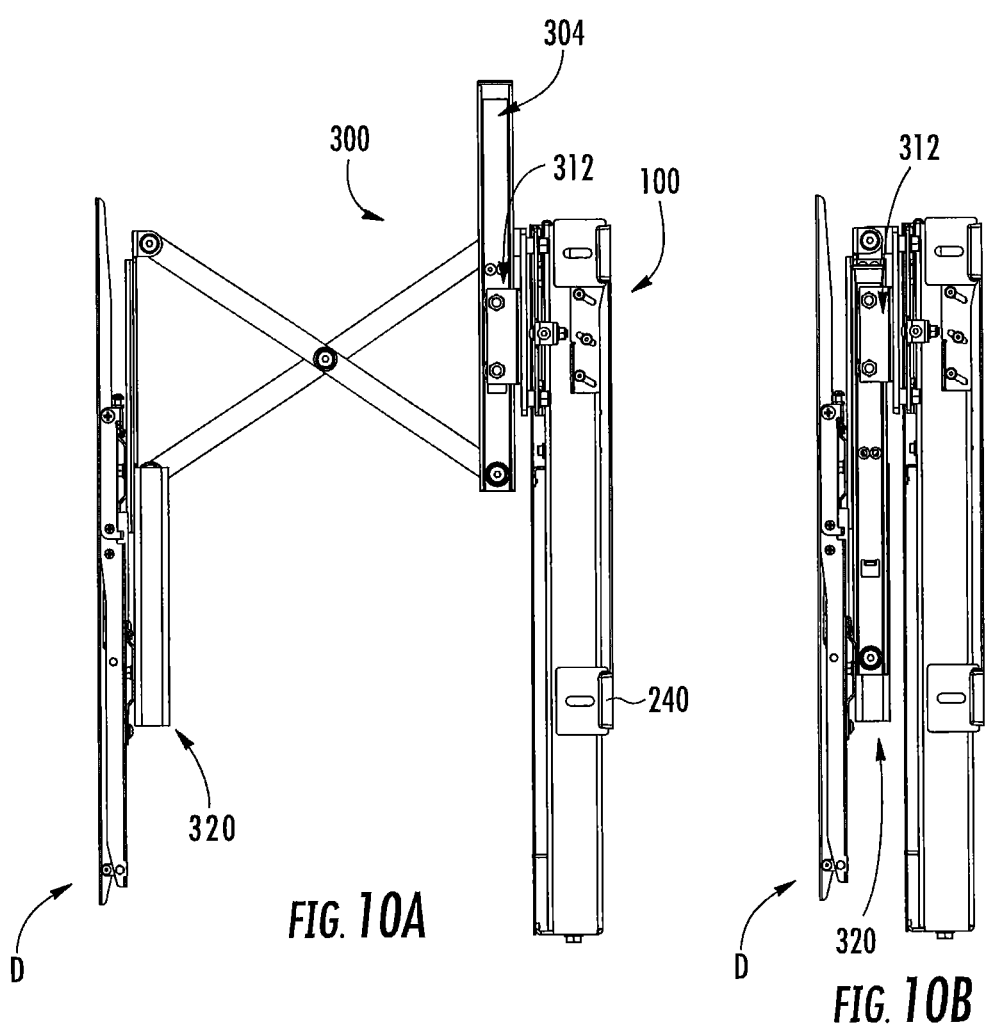
FIGS. 10A and 10B illustrate the mount of FIG. 1 including the horizontal adjustment assembly of FIG. 8 in an open position and a closed position, respectively.

The articulating arm assembly 300 is configured such that the assembly 300 including the bracket 320 can be moved between an open or extended position shown in FIGS. 8 and 10A and a closed or retracted position shown in FIG. 10B.

As the assembly 300 is moved from the extended position to the retracted position, the rollers 324 may translate downwardly in the channels 322 of the bracket 320. Also as the assembly 300 is moved from the extended position to the retracted position, the bearing assemblies 312 may translate upwardly in the channels 310 of the guide tracks 302, 304. The guide tracks 302, 304 may move downwardly to provide the upward translation of the bearing assemblies. The bearing assemblies 312 may be coupled to or operatively coupled to the super plate 180 and the super plate 180 may maintain its vertical position as the assembly 300 is moved between the extended position and the retracted position. For example, referring to FIG. 9, the bearing assemblies 312 may each include an L-shaped or generally L-shaped bracket or flange 326 including a first panel 328 to which bearing(s) 312b are coupled and a second panel 330 that may be coupled to the super plate 180. In the retracted position, the bracket 320 may be received between the guide tracks 302, 304.

It will be appreciated that the rollers 324 and the bearing assemblies 312 translate in the opposite direction to that described above when the articulating arm assembly 300 is moved from the retracted position to the extended position.

According to some embodiments, the above configuration of the articulating arm assembly 300 results in the bracket 320 (and any display coupled thereto) moving only horizontally between the retracted and extended positions. That is, the bracket 320 advantageously does not move vertically (up or down) or substantially vertically when moved between the extended and retracted positions as described in more detail below. This is illustrated in FIGS. 10A and 10B wherein the bracket 320 and a display D coupled thereto do not move vertically or substantially vertically when moved between the extended position (FIG. 10A) and the retracted position (FIG. 10B). As used herein, the terms "does not move substantially vertically" and "without moving substantially vertically" may mean that the bracket 320 and a display D coupled thereto move less than 2 inches vertically when moved between the extended position and the retracted position and, in some embodiments, move less than one inch vertically when moved between the extended position and the retracted position and, in some other embodiments, move less than 0.5 inches vertically when moved between the extended position and the retracted position. Similar limits may be applied to the term "substantially horizontally" as used herein.

Referring again to FIG. 1, a display tilt assembly 340 may be coupled to the bracket 320. The display tilt assembly 340 facilitates rotation of a display coupled thereto in the directions shown by the arrow (i.e., the tilt assembly allows the display to be tilted downward and/or upward).

Figure 11:
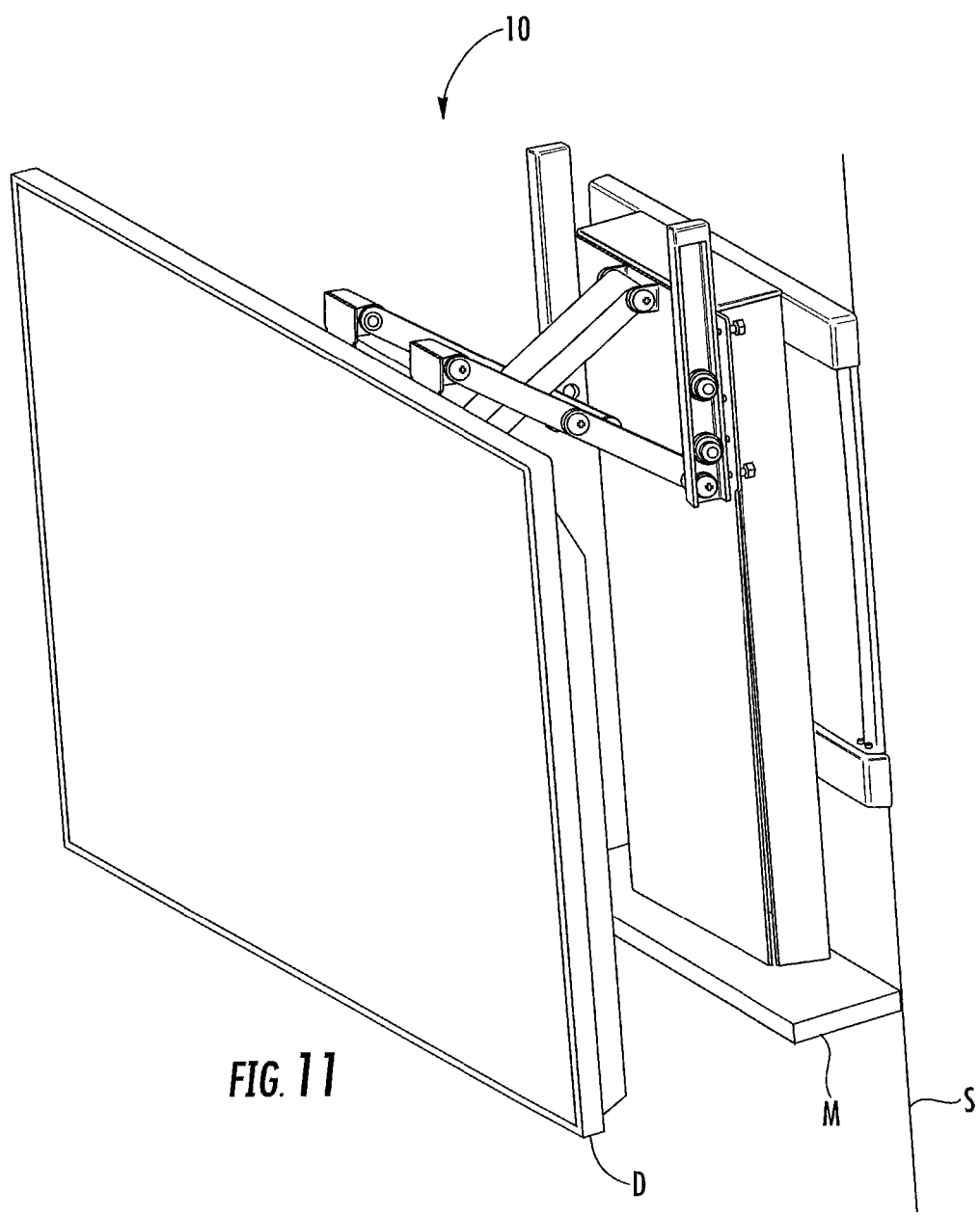
FIG. 11 is a perspective view of a display device coupled to the mount of FIG. 1 according to some embodiments.

FIG. 11 illustrates a flat panel display D coupled to the mount 10. The display D may be coupled to or operatively coupled to the bracket 320 or the tilt assembly 340 (FIG. 1). The mount 10 is coupled to a mounting surface S such as a wall. The mount 10 may be installed over an obstacle such as a fireplace mantel M.

As described above, the mount 10 is configured such that the articulating assembly 300 can be extended and retracted horizontally relative to the vertical lift assembly 100. This means that the bracket 320 and the display D move only horizontally away from and toward the mounting surface or wall S and do not move vertically (up or down) or substantially vertically. This configuration advantageously allows a user to extend the display D directly horizontally away from the wall S a desired distance to clear the edge of the mantel M. The user may then use the vertical lift assembly 100 to lower and raise the display to the desired viewing height.

Therefore, display mounts according to embodiments described herein can have displays mounted thereto that are independently translated horizontally and vertically. That is, these movements are decoupled from one another. This is different from some known mounts in which the display moves downward when it is extended away from the wall. Such a configuration is less desirable when mounting above an obstacle such as a mantel because the display may strike the mantel and/or because the mount is not configured for obstacles of varying size (depth).

The articulating assembly 300 as illustrated in FIGS. 8-11 is configured such that the bracket 320 and any display device coupled thereto can be manually translated horizontally away from and toward the wall. It is also contemplated that the articulating assembly 300 can be motorized to automatically drive the bracket 320 and any display device coupled thereto horizontally away from and toward the wall.

The articulating assembly 300 according to some embodiments is configured to inhibit or prevent the bracket 320 and a display coupled thereto from swinging left or right as the display is translated horizontally. That is, the bracket 320 and the display extend and retract evenly with the display parallel to the wall. This helps prevent a situation where one lower corner of the display is closer to the wall than the other lower corner of the display (which may result in that corner striking the mantel or other obstacle as the display lowered, for example).

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the teachings and advantages of this invention. Accordingly, all such modifications are intended to be included within the scope of this invention as defined in the claims. The invention is defined by the following claims, with equivalents of the claims to be included therein.

What is claimed is:

1. A display mount for mounting a display to a wall, the display mount comprising:

a vertical adjustment mechanism configured to be operatively coupled to the wall; and a horizontal adjustment mechanism having a first end portion operatively coupled to the vertical adjustment mechanism and a second end portion that is configured to be operatively coupled to the display;

wherein the vertical adjustment mechanism comprises:

a housing comprising a back wall, a left sidewall, a right sidewall, a left vertically extending flange extending inwardly from the left sidewall and a right vertically extending flange extending inwardly from the right sidewall;

a left movable bracket adjacent the left vertically extending flange and configured to translate up and down the left vertically extending flange;

a right movable bracket adjacent the right vertically extending flange and configured to translate up and down the right vertically extending flange; and a super plate operatively coupled to the left and right movable brackets and operatively coupled to the horizontal adjustment mechanism;

wherein one of the left and right movable brackets is coupled to a pulley by a cable, the one of the left and right movable brackets having a safety lock mechanism thereon that is configured to rotate and be received in one of a plurality of apertures formed in the back wall of the housing if the cable were to break;

wherein, when the vertical adjustment mechanism is operatively coupled to the wall and when the horizontal adjustment mechanism is operatively coupled to the display:

the vertical adjustment mechanism is configured to lower and raise the display vertically parallel to the wall without the display moving substantially horizontally away from and toward the wall; and the horizontal adjustment mechanism is configured to extend and retract the display horizontally away from and toward the wall without the display moving substantially vertically parallel to the wall.

2. The display mount of claim 1 wherein each of the left and right movable brackets comprises a plurality of rolling bearings coupled thereto, wherein at least one of the rolling bearings of the left movable bracket is positioned between the back wall of the housing and the left vertically extending flange and configured to engage at least one of the back wall of the housing and the left vertically extending flange, and wherein at least one of the rolling bearings of the right movable bracket is positioned between the back wall of the housing and the right vertically extending flange and configured to engage at least one of the back wall of the housing and the right vertically extending flange.

3. The display mount of claim 2 wherein at least one of the rolling bearings of the left movable bracket is positioned on an edge of the left vertically extending flange and configured to engage the edge of the left vertically extending flange, and wherein at least one of the rolling bearings of the right movable bracket is positioned on an edge of the right vertically extending flange and configured to engage the edge of the right vertically extending flange.

4. A display mount for mounting a display to a wall, the display mount comprising:

a vertical adjustment mechanism configured to be operatively coupled to the wall; and a horizontal adjustment mechanism having a first end portion operatively coupled to the vertical adjustment mechanism and a second end portion that is configured to be operatively coupled to the display;

wherein the vertical adjustment mechanism comprises:

a housing comprising a back wall, a left sidewall, a right sidewall, a left vertically extending flange extending inwardly from the left sidewall and a right vertically extending flange extending inwardly from the right sidewall;

a left movable bracket adjacent the left vertically extending flange and configured to translate up and down the left vertically extending flange;

a right movable bracket adjacent the right vertically extending flange and configured to translate up and down the right vertically extending flange; and a super plate operatively coupled to the left and right movable brackets and operatively coupled to the horizontal adjustment mechanism;

wherein each of the left and right movable brackets comprises a plurality of rolling bearings coupled thereto, wherein at least one of the rolling bearings of the left movable bracket is positioned between the back wall of the housing and the left vertically extending flange and configured to engage at least one of the back wall of the housing and the left vertically extending flange, and wherein at least one of the rolling bearings of the right movable bracket is positioned between the back wall of the housing and the right vertically extending flange and configured to engage at least one of the back wall of the housing and the right vertically extending flange;

wherein the housing further comprises:

a left outer housing comprising a front wall and a left sidewall; and a right outer housing comprising a front wall and a right sidewall;

wherein at least one of the rolling bearings of the left movable bracket is positioned on the left sidewall of the left outer housing and configured to engage the left sidewall of the left outer housing, and wherein at least one of the rolling bearings of the right movable bracket is positioned on the right sidewall of the right outer housing and configured to engage the right sidewall of the right outer housing;

wherein, when the vertical adjustment mechanism is operatively coupled to the wall and when the horizontal adjustment mechanism is operatively coupled to the display:

the vertical adjustment mechanism is configured to lower and raise the display vertically parallel to the wall without the display moving substantially horizontally away from and toward the wall; and the horizontal adjustment mechanism is configured to extend and retract the display horizontally away from and toward the wall without the display moving substantially vertically parallel to the wall.

5. The display mount of claim 4 wherein one of the left and right movable brackets is coupled to a pulley by a cable, the one of the left and right movable brackets having a safety lock mechanism thereon that is configured to rotate and be received in one of a plurality of apertures formed in the back wall of the housing if the cable were to break.

6. The display mount of claim 4 wherein at least one of the rolling bearings of the left movable bracket is positioned on an edge of the left vertically extending flange and configured to engage the edge of the left vertically extending flange, and wherein at least one of the rolling bearings of the right movable bracket is positioned on an edge of the right vertically extending flange and configured to engage the edge of the right vertically extending flange.

7. A display mount for mounting a display to a wall, the display mount comprising:
- a vertical adjustment mechanism configured to be operatively coupled to the wall; and
- a horizontal adjustment mechanism having a first end portion operatively coupled to the vertical adjustment mechanism and a second end portion that is configured to be operatively coupled to the display;
- wherein the vertical adjustment mechanism comprises:
  - a housing comprising a back wall, a left sidewall, a right sidewall, a left vertically extending flange extending inwardly from the left sidewall and a right vertically extending flange extending inwardly from the right sidewall;
  - a left movable bracket adjacent the left vertically extending flange and configured to translate up and down the left vertically extending flange;
  - a right movable bracket adjacent the right vertically extending flange and configured to translate up and down the right vertically extending flange; and
  - a super plate operatively coupled to the left and right movable brackets and operatively coupled to the horizontal adjustment mechanism;
- wherein the horizontal adjustment mechanism comprises:
  - left and right guide tracks adjacent opposite sides of the super plate, each guide track having a channel defined therein;
  - a left bearing assembly in the channel of the left guide track and a right bearing assembly in the channel of the right guide track;
  - a display bracket comprising left and right bearing channels extending upwardly from a bottom portion of the display bracket;
  - a left articulating arm having a first end pivotably coupled to the left guide track and a second, opposite end pivotably coupled to a top left portion of the display bracket;
  - a right articulating arm having a first end pivotably coupled to the right guide track and a second, opposite end pivotably coupled to a top right portion of the display bracket; and
  - a center articulating arm having a first end operatively coupled to the left and right bearing assemblies and a second, opposite end comprising a left rolling bearing on a left side of the center articulating arm and a right rolling bearing on the right side of the center articulating arm, the left and right rolling bearings received in the left and right bearing channels of the display bracket, respectively;
- wherein, when the vertical adjustment mechanism is operatively coupled to the wall and when the horizontal adjustment mechanism is operatively coupled to the display:
  - the vertical adjustment mechanism is configured to lower and raise the display vertically parallel to the wall without the display moving substantially horizontally away from and toward the wall; and
  - the horizontal adjustment mechanism is configured to extend and retract the display horizontally away from and toward the wall without the display moving substantially vertically parallel to the wall.

8. The display mount of claim 7 wherein the horizontal adjustment mechanism is movable between a retracted position with the display bracket between the left and right guide tracks and adjacent the super plate and an extended position with the display bracket spaced apart from the super plate, and wherein, when the horizontal adjustment mechanism is moved between the retracted position and the extended position:
- the left bearing assembly translates in the channel of the left guide track and the right bearing assembly translates in the channel of the right guide track; and
- the left rolling bearing on the center articulating arm translates in the left bearing channel of the display bracket and the right rolling bearing on the center articulating arm translates in the right bearing channel of the display bracket.

9. The display mount of claim 7 wherein one of the left and right movable brackets is coupled to a pulley by a cable, the one of the left and right movable brackets having a safety lock mechanism thereon that is configured to rotate and be received in one of a plurality of apertures formed in the back wall of the housing if the cable were to break.

10. The display mount of claim 7 wherein each of the left and right movable brackets comprises a plurality of rolling bearings coupled thereto, wherein at least one of the rolling bearings of the left movable bracket is positioned between the back wall of the housing and the left vertically extending flange and configured to engage at least one of the back wall of the housing and the left vertically extending flange, and wherein at least one of the rolling bearings of the right movable bracket is positioned between the back wall of the housing and the right vertically extending flange and configured to engage at least one of the back wall of the housing and the right vertically extending flange.

11. The display mount of claim 10 wherein at least one of the rolling bearings of the left movable bracket is positioned on an edge of the left vertically extending flange and configured to engage the edge of the left vertically extending flange, and wherein at least one of the rolling bearings of the right movable bracket is positioned on an edge of the right vertically extending flange and configured to engage the edge of the right vertically extending flange.

* * * * *